US011016776B2

(12) United States Patent
Han et al.

(10) Patent No.: US 11,016,776 B2
(45) Date of Patent: May 25, 2021

(54) SYSTEM AND METHOD FOR EXECUTING INSTRUCTIONS

(71) Applicant: ALIBABA GROUP HOLDING LIMITED, Grand Cayman (KY)

(72) Inventors: Liang Han, San Mateo, CA (US); Xiaowei Jiang, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/231,280

(22) Filed: Dec. 21, 2018

(65) Prior Publication Data

US 2019/0196840 A1    Jun. 27, 2019

Related U.S. Application Data

(60) Provisional application No. 62/610,111, filed on Dec. 22, 2017.

(51) Int. Cl.
*G06F 9/30* (2018.01)
*G06F 9/38* (2018.01)
*G06F 8/41* (2018.01)

(52) U.S. Cl.
CPC .............. *G06F 9/3867* (2013.01); *G06F 8/41* (2013.01); *G06F 9/30145* (2013.01); *G06F 9/3838* (2013.01); *G06F 9/3851* (2013.01); *G06F 9/3885* (2013.01); *G06F 8/45* (2013.01); *G06F 9/382* (2013.01)

(58) Field of Classification Search
CPC .. G06F 9/3867; G06F 9/30145; G06F 9/3838; G06F 9/3851; G06F 9/3885; G06F 9/3853; G06F 9/3855; G06F 9/38; G06F 9/3814; G06F 9/3836; G06F 9/3818;
(Continued)

(56) References Cited

U.S. PATENT DOCUMENTS 6,154,828 A    11/2000    Macri et al.
6,523,110 B1    2/2003    Bright et al.
(Continued)

FOREIGN PATENT DOCUMENTS

EP    0 950 946 A2    10/1999
EP    0 950 946 A3    10/1999
WO    WO 2019/126797 A3    6/2019

OTHER PUBLICATIONS

International Search Report and Written Opinion issued by the International Searching Authority in related PCT Application No. PCT/US2018/067377, dated Apr. 1, 2019 (9 pgs.).
(Continued)

*Primary Examiner* — Daniel H Pan
(74) *Attorney, Agent, or Firm* — Finnegan, Henderson, Farabow, Garrett & Dunner, LLP

(57) ABSTRACT

The present disclosure provides systems and methods for executing instructions. The system can include: processing unit having a core configured to execute instructions; and a host unit configured to: compile computer code into a plurality of instructions that includes a set of instructions that are determined to be executed in parallel on the core, wherein the set of instructions each includes an operation instruction and an indication bit and wherein the indication bit is set to identify the last instruction of the set of instructions, and provide the set of instructions to the core.

16 Claims, 8 Drawing Sheets

(58) Field of Classification Search
CPC ... G06F 9/382; G06F 8/41; G06F 8/45; G06F 8/456
USPC ... 712/212, 213, 215, 216–219, 23, 24, 245; 717/140, 149, 150
See application file for complete search history.

(56) References Cited

U.S. PATENT DOCUMENTS

| | | | | |
|---|---|---|---|---|
| 7,117,389 | B2* | 10/2006 | Luick | G06F 11/2028 714/11 |
| 8,549,258 | B2* | 10/2013 | Lee | G06F 9/3824 712/15 |
| 2002/0166042 | A1* | 11/2002 | Almog | G06F 9/3806 712/238 |
| 2003/0079114 | A1* | 4/2003 | Heishi | G06F 9/30036 712/213 |
| 2012/0047351 | A1* | 2/2012 | Morrison | G06F 9/30145 712/208 |
| 2012/0246450 | A1* | 9/2012 | Abdallah | G06F 9/5077 712/216 |
| 2013/0166886 | A1 | 6/2013 | Sasanka et al. | |

OTHER PUBLICATIONS

The extended European search report, pursuant to Rule 62 EPC, the supplementary European search report (Art. 153(7) EPC) and the European search opinion issued in related Application No. 18890584.8, dated Jan. 26, 2021 (11 Pgs.).
Sun et al., "An Efficient Parallel Instruction Execution Method for VLIW DSP," IEEE, pp. 75-78, (2009).

* cited by examiner

SYSTEM AND METHOD FOR EXECUTING INSTRUCTIONS

CROSS REFERENCE TO RELATED APPLICATION

The disclosure claims the benefits of priority to U.S. Provisional Application No. 62/610,111, filed Dec. 22, 2017, which is incorporated herein by reference in its entirety.

BACKGROUND

Neural network processing units (NPUs) have become one potential processor capable of deep learning application. As a programmable processer, NPUs uses defined instructions to express the functionality that is hardware is designed to perform. A full set of such instructions to enable NPUs computing is referred to as an instruction set.

In practice, multiple independent instructions can be executed simultaneously in hardware. Such level of parallelism is called Instruction Level Parallelism (ILP). There are two well-known architectures to explore ILP: SuperScalar and Very Long Instruction Word (VLIW). SuperScalar machines are capable of dynamically issuing multiple instructions at each clock cycle from a conventional linear instruction stream. SuperScalar relies on hardware to dynamically analyze and schedule data-independent instructions to be executed in parallel.

But both of these conventional ILP architectures have flaws. For example, the SuperScalar architecture has issues with the complexity and time cost of dependency checking logic, which becomes even more profound when dealing with NPUs where each instruction can operate on 512 variables and can need up to 2048 cycles to finish. Moreover, the VLIW architecture (and its variants such as Variable Length Execution Set (VLES)) can waste memory space and computation resources.

SUMMARY OF THE DISCLOSURE

Embodiments of the disclosure provide a system for executing instructions. The system can include: a processing unit having a core configured to execute instructions; and a host unit configured to: compile computer code into a plurality of instructions that includes a set of instructions that are determined to be executed in parallel on the core, wherein the set of instructions each includes an operation instruction and an indication bit and wherein the indication bit is set to identify the last instruction of the set of instructions and provide the set of instructions to the processing unit for the core to execute.

Embodiments of the disclosure further provide a method performed by a host processing unit. The method can include: compiling, by the host processing unit, computer code into a plurality of instructions that includes a set of instructions that are determined to be executed in parallel on a core, wherein the set of instructions each includes an operation instruction and an indication bit and wherein the indication bit is set to identify the last instruction of the set of instructions, and providing the set of instructions to the core for execution.

Embodiments of the disclosure also provide a method performed by a core of a processing unit. The method can include: fetching an instruction of a set of instructions from an instruction buffer; decoding the instruction; issuing the decoded instruction to an execution unit for execution; determining whether the decoded instruction is a last instruction of the set of instructions based on an indication bit associated with the decoded instruction; and in response to the determination that the decoded instruction is not the last instruction of the set of instructions, fetching a subsequent instruction of the set of instructions.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

Due to the parallelism explored by VLIW and VLES, instructions having no data dependency can be executed in parallel, so that execution time can be reduced. For example, the following exemplary program includes instructions 1-3 as below:

---
Instruction 1: e=a+b
Instruction 2: f=c+d
Instruction 3: m=e×f
---

Example 1

As it can be seen from the above exemplary program, instructions 1 and 2 are independent from each other and can be processed simultaneously, while instruction 3 depends on the results of instructions 1 and 2. For processors having ILP capabilities, instructions 1 and 2 can be processed simultaneously in a first unit of time, and then instruction 3 can be processed in a second unit of time. In other words, these three instructions can be completed in a total of two units of time. On the contrary, if none of the instructions can be processed in parallel, the process time could be three units of time. An instruction level parallelism (ILP) can be defined according to the parallel process time and non-parallel process time.

Figure 1:
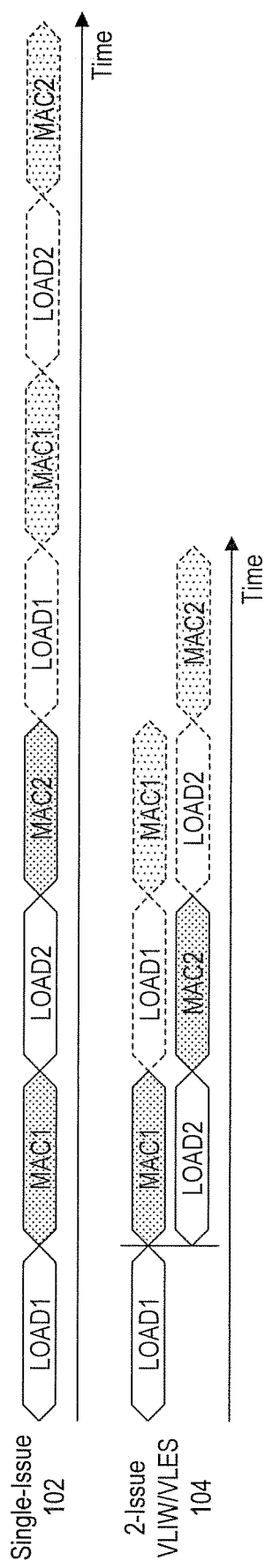
FIG. 1 illustrates exemplary sequence diagrams of conventional architectures.

To illustrate the difference between where instructions are processed one at a time versus in parallel, FIG. 1 illustrates exemplary sequences. FIG. 1 includes a sequence diagram 102 corresponding to instruction allocation of a single-issue architecture where instructions are processed one at a time, and a sequence diagram 104 corresponding to instruction allocation of a two-issue architecture where instructions are processed in parallel.

The ILP for different architectures, such as Super Scalar and VLIW, can be different. Super Scalar relies on hardware to dynamically analyze and schedule data-independent instructions to be executed in parallel. VLIW relies on a compiler to statically analyze data dependency and hardware resource availability between instructions of a program and packs all independent instructions into a very-long-instruction-word to be executed in parallel in hardware. VLIW can generally use a compiler to unroll a loop and use a software pipeline to find more independent instructions. For example, Example 2 below can calculate a sum of squares of 100 numbers.

```
r2=0;
for (r1=0;r1<100;r1++) {
    LOAD r0 Mem[base+r1];
    MAD r2 r2 r0 r0;
}
```

Example 2

In above Example 2, "LOAD" includes an operation to load a value from designated memory address to a local memory. For example, "LOAD r0 Mem [base+r1]" can load the value stored in memory address "Mem [base+r1]," and assign the value to r0. "MAC" includes a multiply-accumulation operation of multiplication. In the exemplary multiply-accumulation operation of "MAC r2 r2 r0 r0," r2=r2+r0×r0. Therefore, r2 is an accumulative sum of a square of r0.

Because iterations of MAC and iterations of LOAD are independent, parallelism can be explored between the iterations of MAC and LOAD, as shown in Example 3 below:

```
r2=0;
for (r1=0;r1<50;r1+=2) {
    LOAD r0 Mem[base+r1];
    MAD r2 r2 r0 r0;   |    LOAD r0 Mem[base+r1+1];
                            MAD r2 r2 r0 r0;
}
```

Example 3

It can be seen from Example 3 that, the loop body (i.e., instructions enclosed by the brackets) can include a first iteration and a second iteration. The first iteration can include instructions of "LOAD r0 Mem [base+r1]" and "MAC r2 r2 r0 r0," and the second iteration can include instructions of "LOAD r0 Mem [base+r1+1]" and "MAC r2 r2 r0 r0."

As discussed above, two architectures of Very Long Instruction Word (VLIW) and Variable Length Execution Set (VLES) can be used to explore the parallelism of instructions. Details will be further introduced below with reference to Example 3.

VLIW is architecture for exploring ILP. Instructions of VLIW can have a same length. The instructions having the same length can also be referred to as instruction words. For example, generated instruction words in the loop body can include instruction words of W1, W2, and W3, as below:

```
W1: LOAD r0 Mem[base+r1]; | NOP;
W2: MAD r2 r2 r0 r0; | LOAD r0 Mem[base+r1+1];
W3: NOP; | MAD r2 r2 r0 r0;
```

"NOP" is short of "No operation" and can include a padding of a few bits so that the instruction words have the same length. Each of the instruction words W1, W2, and W3 can include two instructions. For example, instruction word W1 includes a first instruction "LOAD" and a second instruction "NOP" in parallel. This VLIW architecture capable of processing two instructions can also be referred to as dual-issue VLIW architecture (DIVA). For example, DIVA can fetch two instruction words at a time, and execute the fetched instructions by separate execution units in parallel. DIVA can ignore the NOPs and issue other effective instructions down to execution units. Though the padding "NOP" indicates no operation, it can still occupy cache space and bus width.

Variable Length Execution Set (VLES) is architecture for exploring ILP. With the same codes of above Example 3, VLES can generate four instructions (i.e., i1, i2, i3, and i4) based on the loop body of Example 3, as shown in Example 4 below:

```
    head1_#1;
i1: LOAD r0 Mem[base+r1];
    head2_#2;
i2: MAD r2 r2 r0 r0;
i3: LOAD r0 Mem[base+r1+1];
    head3_#1;
i4: MAD r2 r2 r0 r0;
```

Example 4

Referring to FIG. 1, LOAD1 and MAC1 corresponds to the i1 and i2 instructions in Example 4, respectively. And LOAD2 and MAC2 correspond to the i3 and i4 instruction in Example 4, respectively. In sequence diagram 102 of the single-issue architecture and sequence diagram 104 of the two-issue architecture, sections with solid lines can form a first iteration of the loop body, and the sections with dashed lines can form a second iteration of the loop body. Therefore, in FIG. 1, each of the first and second iterations can include instructions i1, i2, i3, and i4.

In sequence diagram 102, the second iteration can only be executed after the first iteration has been executed, as the single-issue architecture can only process instructions in serial. In sequence diagram 104, as the parallelism of instructions can be explored, instructions without dependency can be executed in parallel. For example, MAC1 and LOAD2 have no dependency, and can be executed in parallel as shown in sequence diagram 104. It is appreciated that the instruction of "LOAD2" can only be executed after the execution of the instruction of "LOAD1" is finished, as the hardware resources can be still occupied during the execution of the instruction of "LOAD1."

As discussed above with Example 4, VLES can use short "head" information to indicate that how many instructions belong to one long-instruction-word. Compared with VLIW, the short "head" information can save some memory space and bus-bandwidth. But the head information can introduce extra hardware costs, as the hardware may have to parse the head information. Other than hardware resource usage, VLES can further require a larger instruction buffer due to the following reasons.

First, the head information can occupy some space in the instruction buffer. The head information can occupy a few bits in each VLES instruction. For example, 3-4 bits may be occupied in the VLES instruction encoding space by the head information.

Second, though it can be assumed that the head information takes no extra space, VLES can still have an alignment issue. With reference to above Example 4, a compiler can fetch instructions i1 and i2 into the cache unit in a clock cycle. The compiler can then read the head1_#1 and issue instruction i1 for execution. Then, instruction i2 is left in the instruction buffer. If VLES fetches two instructions next, the instructions in the instruction buffer can be mis-aligned. Therefore, VLES can use a wider instruction buffer. For example, the cache unit can have a width of four instructions. It is appreciated that, when the VLES can fetch four instructions at a time, the cache unit can have a width of eight instructions. Thus, VLES can require more hardware resources for execution.

While the architectures of VLIW and VLES can speed up the performance of computation when compared to single-issue instructions, both VLIW and VLES require extra hardware to support the exploration of instruction parallelism. These conventional solutions can be very problematic for some applications fields such as machine learning where the compute granularity is very course. Machine learning generally computes on a huge matrix, instead of scalar variables. For example, each instruction of the foregoing program, i1, i2, i3, and i4, can operate on 512 variables and require 2048 cycles to finish. The embodiments of the disclosure utilize the hardware resources more efficiently.

Figure 2A:
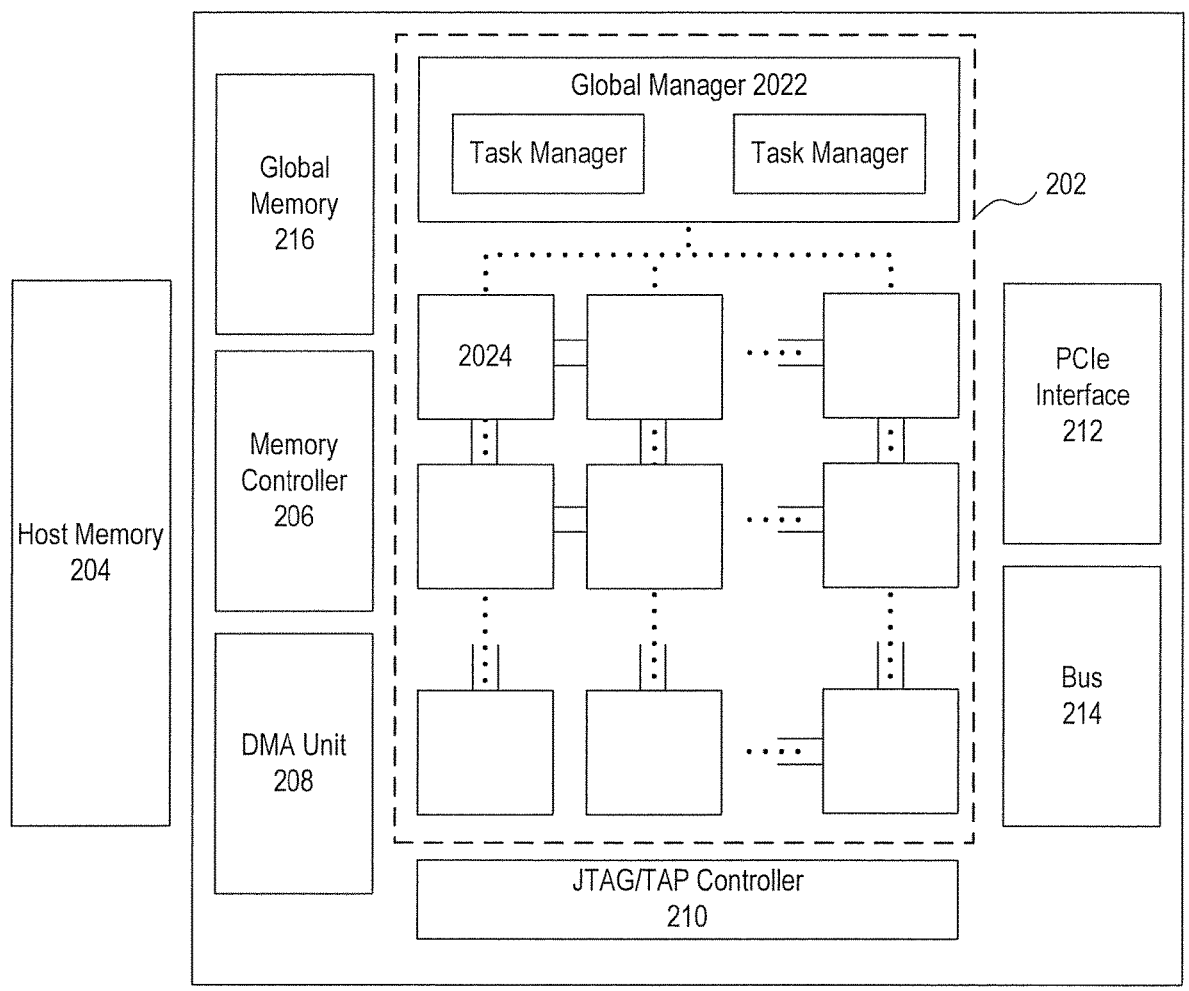
FIG. 2A illustrates exemplary on-chip architecture, according to embodiments of the disclosure.

FIG. 2A illustrates exemplary neural network processing unit (NPU) architecture 200, according to embodiments of the disclosure. As shown in FIG. 2A, NPU architecture 200 can include a chip communication system 202, an host memory 204, a memory controller 206, a direct memory access (DMA) unit 208, a Joint Test Action Group (JTAG)/Test Access End (TAP) controller 210, a peripheral interface 212, a bus 214, a global memory 216, and the like. It is appreciated that, chip communication system 202 can perform arithmetic operations based on communicated data.

Chip communication system 202 can include a global manager 2022 and a plurality of cores 2024. Global manager 2022 can include at least one task manager to coordinate with one or more cores 2024. Each task manager can be associated with an array of cores 2024 that provide synapse/neuron circuitry for the neural network. For example, the top layer of processing elements of FIG. 2A may provide circuitry representing an input layer to neural network, while the second layer of tiles may provide circuitry representing a hidden layer of the neural network. As shown in FIG. 2A, global manager 2022 can include two task managers to coordinate with two arrays of cores.

Cores 2024 can include one or more processing elements that each include single instruction, multiple data (SIMD) architecture including one or more processing units configured to perform one or more operations (e.g., multiplication, addition, multiply-accumulate, etc.) based on instructions received from global manager 2022. To perform the operation on the communicated data packets, cores 2024 can include one or more processing elements for processing information in the data packets. Each processing element may comprise any number of processing units. In some embodiments, core 2024 can be considered a tile or the like.

Host memory 204 can be off-chip memory such as a host CPU's memory. For example, host memory 204 can be a DDR memory (e.g., DDR SDRAM) or the like. Host memory 204 can be configured to store a large amount of data with slower access speed, compared to the on-chip memory integrated within one or more processors, acting as a higher-level cache.

Memory controller 206 can manage the reading and writing of data to and from a specific memory block within global memory 216 having on-chip memory blocks (e.g., 4 blocks of 8 GB second generation of high bandwidth memory (HBM2)) to serve as main memory. For example, memory controller 206 can manage read/write data coming from outside chip communication system 202 (e.g., from DMA unit 208 or a DMA unit corresponding with another NPU) or from inside chip communication system 202 (e.g., from a local memory in core 2024 via a 2D mesh controlled by a task manager of global manager 2022). Moreover, while one memory controller is shown in FIG. 2A, it is appreciated that more than one memory controller can be provided in NPU architecture 200. For example, there can be one memory controller for each memory block (e.g., HBM2) within global memory 216.

Memory controller 206 can generate memory addresses and initiate memory read or write cycles. Memory controller 206 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 208 can assist with transferring data between host memory 204 and global memory 216. In addition, DMA unit 208 can assist with transferring data between multiple NPUs (e.g., NPU 200). DMA unit 208 can allow off-chip devices to access both on-chip and off-chip memory without causing a CPU interrupt. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that NPU architecture 200 can include a second DMA unit, which can be used to transfer data between other NPU architecture to allow multiple NPU architectures to communication directly without involving the host CPU.

JTAG/TAP controller 210 can specify a dedicated debug port implementing a serial communications interface (e.g., a JTAG interface) for low-overhead access to the NPU without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the NPU and other devices.

Bus 214 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

While NPU architecture 200 of FIG. 2A incorporates the embodiments of the present disclosure, it is appreciated that the disclosed embodiments can be applied to any other processing unit or accelerator. Such units can be, for example, an accelerator such as GPU, CPU with vector and matrix processing ability, or neural network accelerators for deep learning. In some embodiments, the processing unit can include SIMD architecture for accelerating some applications such as deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

In some embodiments, the processing unit (e.g., such as NPU architecture 200) can comprise a compiler. The compiler is a program or computer software that transforms computer codes written in one programming language into instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler that generates the instructions can be on a host unit (e.g., CPU having host memory 204), which pushes commands to NPU 200. Based on these commands, each task manager can assign one or more free cores to a new task and manage synchronization between cores if necessary. Some of the commands can instruct DMA unit 208 to load the instructions (generated by the compiler) and data from host memory 204 into global memory 216. The loaded instructions can then be distributed to the instruction buffer of each core assigned with the corresponding task, and the core can process these instructions accordingly.

It is appreciated that the first few instructions received by the core can instruct the core to load/store data from global memory 216 into an instruction buffer of the core. Each core can then initiate the instruction pipeline, which involves fetching the instruction (e.g., via a fetch unit) from the instruction buffer, decoding the instruction (e.g., via an instruction decoder) and generating local memory addresses (e.g., corresponding to an operand), reading the source data, executing or loading/storing operations, and then writing back results.

Figure 2B:
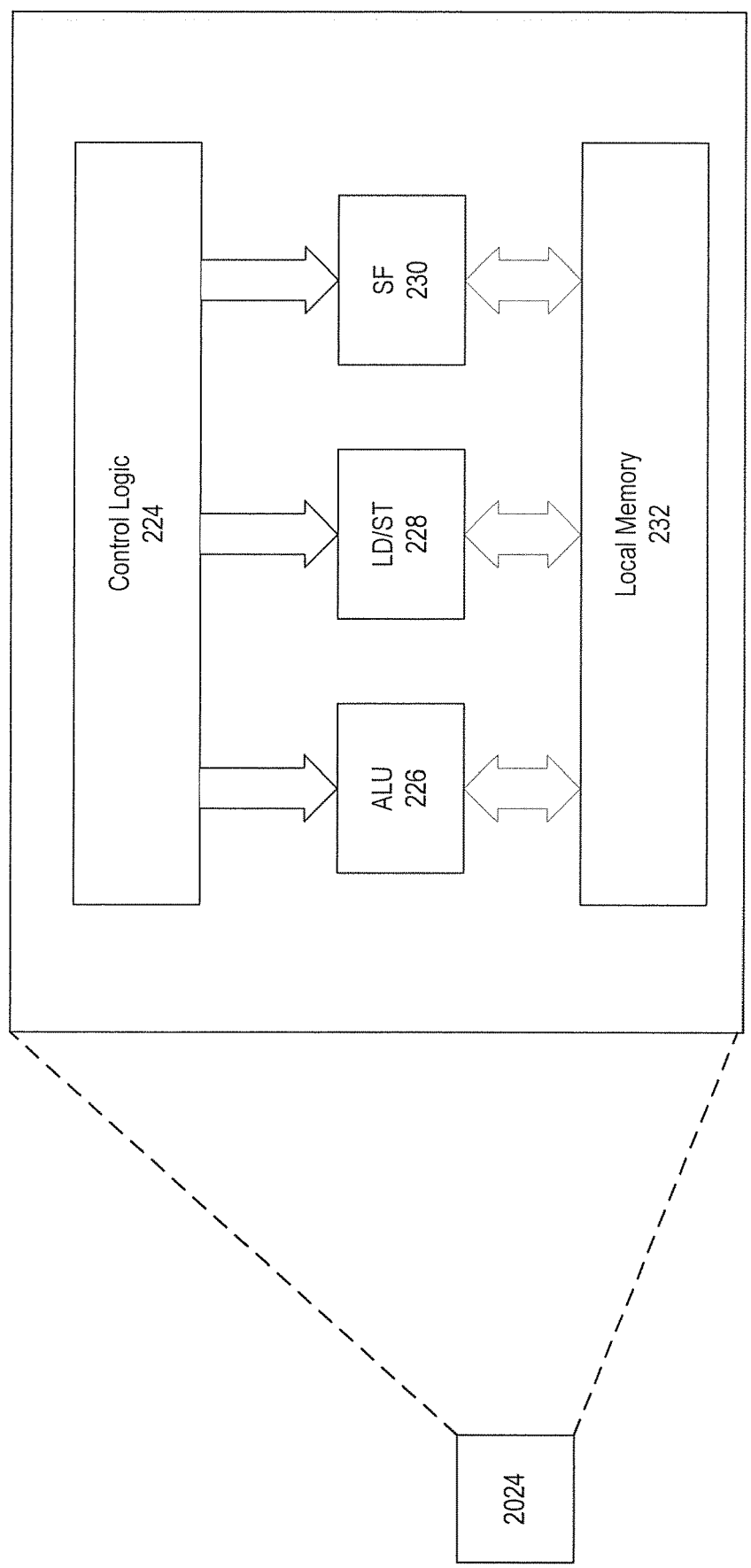
FIG. 2B illustrates an exemplary core of FIG. 2A, according to embodiments of the disclosure.

FIG. 2B illustrates a schematic diagram of a core 2024, according embodiments of the disclosure. Core 2024 can include a control logic 224, multiple execution units (such as an-arithmetic logic unit (ALU) 226, a load/store (LD/ST) unit 228, and a special function (SF) unit 230), and a local memory 232.

Control logic 224 can send decoded instructions to the multiple execution units for execution and can minimize pipeline stalls. For example, a MAD instruction can be sent to ALU 226, a LOAD instruction can be sent to LD/ST unit 228, and a cosine function can be sent to SF unit 230. The CES architecture can be used to explore ILP within each core to allow the multiple execution units to work in parallel.

Local memory 232 can store results generated by the multiple execution units. The stored results can be further accessed by subsequent instructions and provided back to ALU 224, LD/ST unit 228, and SF unit 230.

Moreover, while CES is applied to each core 2024 as illustrated as being part of NPU architecture 200, such ILP exploration scheme can be applied to any general-purpose multi-issuing processors such as CPUs and DSPs.

Figure 3:
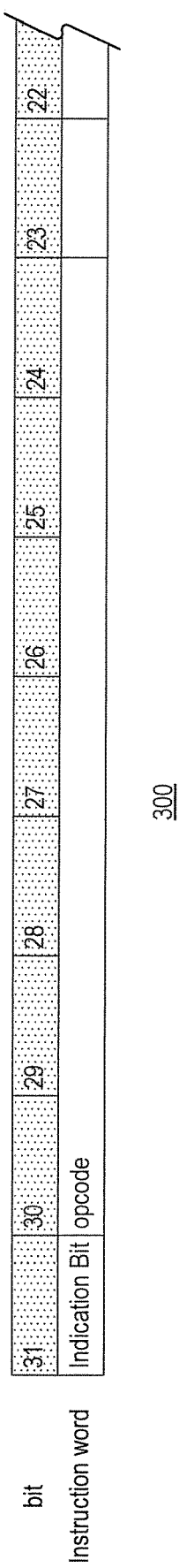
FIG. 3 illustrates an exemplary instruction of a Continuous Execution Set (CES) architecture, according to embodiments of the disclosure.

FIG. 3 illustrates an exemplary Continuous Execution Set (CES) instruction 300 of a Continuous Execution Set (CES) architecture, according to embodiments of the disclosure. The compiler can generate CES instruction 300 based on a transformation. As indicated above, CES instruction 300 can be loaded into global memory 216 and subsequently into one or more local memories of one or more cores. Afterwards, CES instruction 300 can be fetched and decoded (via an instruction decoder).

As shown in FIG. 3, CES instruction 300 can include an indication bit (e.g., bit 31) and a plurality of operation-code bits (e.g., bits 24-31) corresponding to an instruction. While FIG. 3 shows that indication bit is located at bit 31, it is appreciated that the indication bit can be located anywhere within CES instruction 300. For example, indication bit could be located at bit 23 before the operation-code bits. In the CES architecture, CES instruction 300 can include one instruction associated with the operation code bits.

If the indication bit is set in instruction 300, it indicates that this instruction 300 is the last set of one or more instructions that can be processed in parallel. That is, all corresponding instructions before this instruction and this instruction can be processed in parallel, while one or more subsequent instructions will not be executed in parallel with this instruction. While the setting of the indication bit to "1" means that this instruction is the last instruction of a continuous set of instructions and to "0" when this instruction is not the last instruction, it is appreciated that these indication bit values can be reversed. It is appreciated that a width of the indication bit can be one bit. By having the indication bit of the CES architecture, the compiler of the host unit can explore the Instruction Level Parallelism (ILP) of the code when generating NPU instructions coded in CES instruction 300. For example, unlike VLIW discussed above, instruction 300 uses no padding bits to generate instruction words having a same length. Accordingly, unlike VLIW, the CES architecture does not waste precious memory space and bus bandwidth with padding bits.

CES instruction 300 also differentiates from a VLES instruction word by excluding the head information of each instruction included in the VLES instruction word. Thus, CES instruction 300 can cure the deficiencies of conventional architectures (e.g., VLIW and VLES) by using the indication bit. More detailed description of the indication bit included in instruction word 300 will be provided as below.

In some embodiments, to generate the instructions, the compiler can determine data dependency and control dependency among a sequence of instructions. The determination of data dependency of instructions can be associated with the execution logic of instructions. For example, with reference back to above Example 1, instructions 1 and 2 are independent from each other while instruction 3 is dependent on the execution results of instructions 1 and 2. Therefore, instructions 1 and 2 can be parallel instructions and can be executed in parallel according to available hardware resources.

Based on this determination, the compiler can set the indication bit of CES instruction 300. In some embodiments, an indication bit of "1" can indicate that the last instruction of CES instruction 300 is the last one of a set of parallel instructions. An instruction bit of "0" can indicate that the instruction is not the last instruction of the set of parallel instructions. The set of parallel instructions including this last instruction can be referred to as a Continuous Execution Set (CES).

In some embodiments, as discussed, if the indication bit of a first instruction is "0," the instruction is not the last instruction of the set of parallel instructions.

It is appreciated that the configuration of the indication bit can be different from the above embodiments. For example, though the indication bit in FIG. 3 is shown at an end of the instruction, the indication bit can be any bit of the instruction, depending on the instruction encoding design. Furthermore, the instruction of FIG. 3 is an instruction of 32 bits, however, it is appreciated that a length of the instruction can be different and may not be limited by embodiments of FIG. 3.

In some embodiment, besides the indication bit, the compiler can pack at least some of the continuous execution set of the parallel instructions into at least one instruction word. Moreover, the packing of parallel instructions into one instruction word can take into consideration whether the available hardware resource cannot support the parallelism of all instructions. Thus, a number of the parallel instructions in the instruction word may satisfy a value. For example, the value can be the number of execution units, and the number of the parallel instructions in the CES instruction word is less than or equal to the number of available execution units.

As discussed above, in the CES architecture, an indication bit can indicate whether a last instruction of a continuous execution set of parallel instructions. For example, a first indication bit of a first instruction can be "0," indicating that the first instruction is not the last parallel instruction of the continuous execution set of parallel instructions. Thus, when the value (e.g., "0") of the first indication bit is received by the instruction decoder, the instruction decoder can determine that the first instruction includes subsequent instructions in the continuous execution set. A second indication bit of a second instruction word can be "1," indicting that the second instruction is a last instruction of the continuous execution set of parallel instructions. Thus, when the value (e.g., "1") of the second indication bit is received by instruction decoder, the instruction decoder can determine that the second instruction is the last instruction of the continuous execution set.

As discussed above, for example, VLES can fetch two instructions or more in a clock cycle. However, in the CES architecture, a core can fetch (e.g., via fetch unit of the core) one instruction per clock cycle. The core can determine whether the indication bit of an instruction word is "1" or "0" and, if the indication bit is "0," continues to fetch a next instruction of the continuous set of instructions in the next clock cycle. In other words, a process of fetching parallel instructions continues until an indication bit of "1" is reached. Therefore, an instruction having the indication bit of "1" is a last instruction of a continuous execution set. That is, the last instruction and all instructions before the last instruction can form a set of parallel instructions. Therefore, the compiler can determine data dependency of the parallel instructions based on the instruction bit, so that the parallel instructions can be scheduled according to the determined data dependency. It is appreciated that the determined data dependency can be on a per cycle basis.

As the CES architecture uses only one extra bit to an instruction for indicating parallelism within the CES, a device running the CES architecture can consume less hardware resources than conventional architectures.

Figure 4:
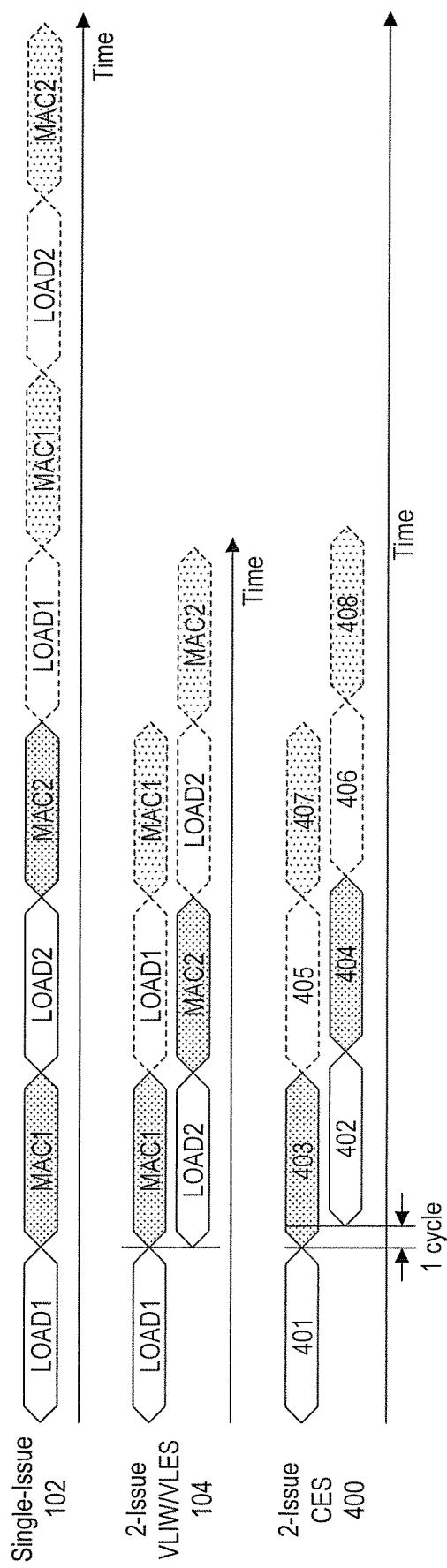
FIG. 4 illustrates a sequence diagram of an exemplary CES architecture, according to embodiments of the disclosure.

FIG. 4 illustrates a sequence diagram 400 of an exemplary CES architecture, according to embodiments of the disclosure.

As shown in FIG. 4, instructions 402 and 403 are parallel instructions, and thus can be executed in parallel. As discussed above, the hardware (e.g., NPU architecture 200) can only fetch one instruction in a cycle. Therefore, when instruction 403 is fetched for execution in a first cycle, instruction 402 that is parallel with instruction 403 can be fetched one cycle after the first cycle. Accordingly, if instruction 402 takes 20 clock cycles to finish, while it takes instruction 403 25 clock cycles, the execution of these two instructions can overlap (or run in parallel In coarse grained computing, an execution of an instruction can take a plurality of cycles (e.g., 2048 cycles). Though instruction 402 is fetched and executed one cycle after its parallel instruction 403, the cost for fetching instructions (in this example, one cycle) is minimal. Therefore, the indication bit can distinguish parallel instructions, so that the hardware can execute these parallel instructions simultaneously. Thus, the CES architecture only pays a cost of one bit and overcomes the drawbacks of VLIW/VLES.

Figure 5:
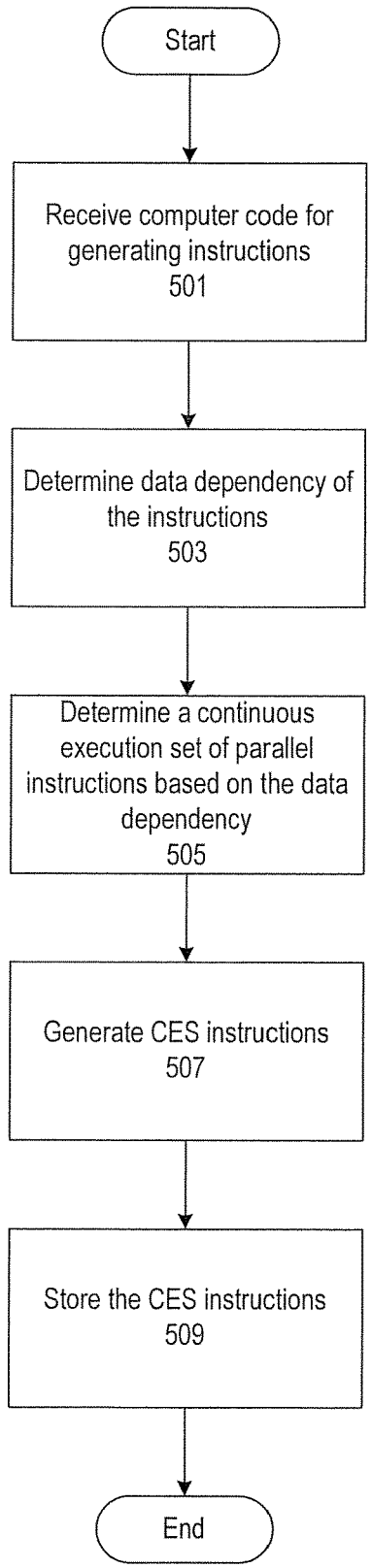
FIG. 5 illustrates a flowchart of a method for generating instructions, according to embodiments of the disclosure.

FIG. 5 illustrates a flowchart of a method 500 for generating instructions, according to embodiments of the disclosure. Method 500 can be executed by, for example, a compiler of a host CPU, and can include steps 501, 503, and 505.

In step 501, the compiler can receive computer code for generating instructions.

In step 503, using the computer code, the compiler can determine the data dependency for each operation of a program and which operations can be executed in parallel. The determination of data dependency of instructions can be associated with the execution logic of instructions. The instructions can be rolled or unrolled. Moreover, the compiler can take into consideration the 1-cycle delay per instruction in the CES architecture for determining the data dependency when scheduling instructions.

In step 505, the compiler can determine the continuous execution set of parallel instructions based on the data dependency. Based on the determined data dependency of the parallel instructions and the availability of hardware resources, the compiler can determine a continuous execution set to include the parallel instructions.

Based on this determination, in step 507, the compiler can generate CES instructions, wherein each instruction can have an operation instruction and an indication bit. As stated above, the indication bit (also referred to as a last-parallel instruction bit) can indicate whether the instruction is a last instruction of a continuous execution set of parallel instructions. As discussed above, for example, the indication bit of "1" can indicate that this instruction is the last instruction of the set of instructions to be executed in parallel. It is appreciated that a width of the indication bit is one bit. In some embodiments, the set of instructions that are to be processed in parallel can be packaged together into a word. In such embodiments, each instruction can have the indication bit.

After the generation of the CES instructions, in step 509, the CES instructions can be stored for later processing. The instructions can be stored in a host memory (e.g., host memory 204) or a global memory of the NPU (e.g., global memory 216). If the instructions are stored in the host memory, a DMA unit of the NPU (e.g., DMA unit 140) can load instructions and data from the host memory into the global memory. The loaded instructions can then be distributed to each core assigned with a corresponding task, and the one or more cores can process these instructions.

Figure 6A:
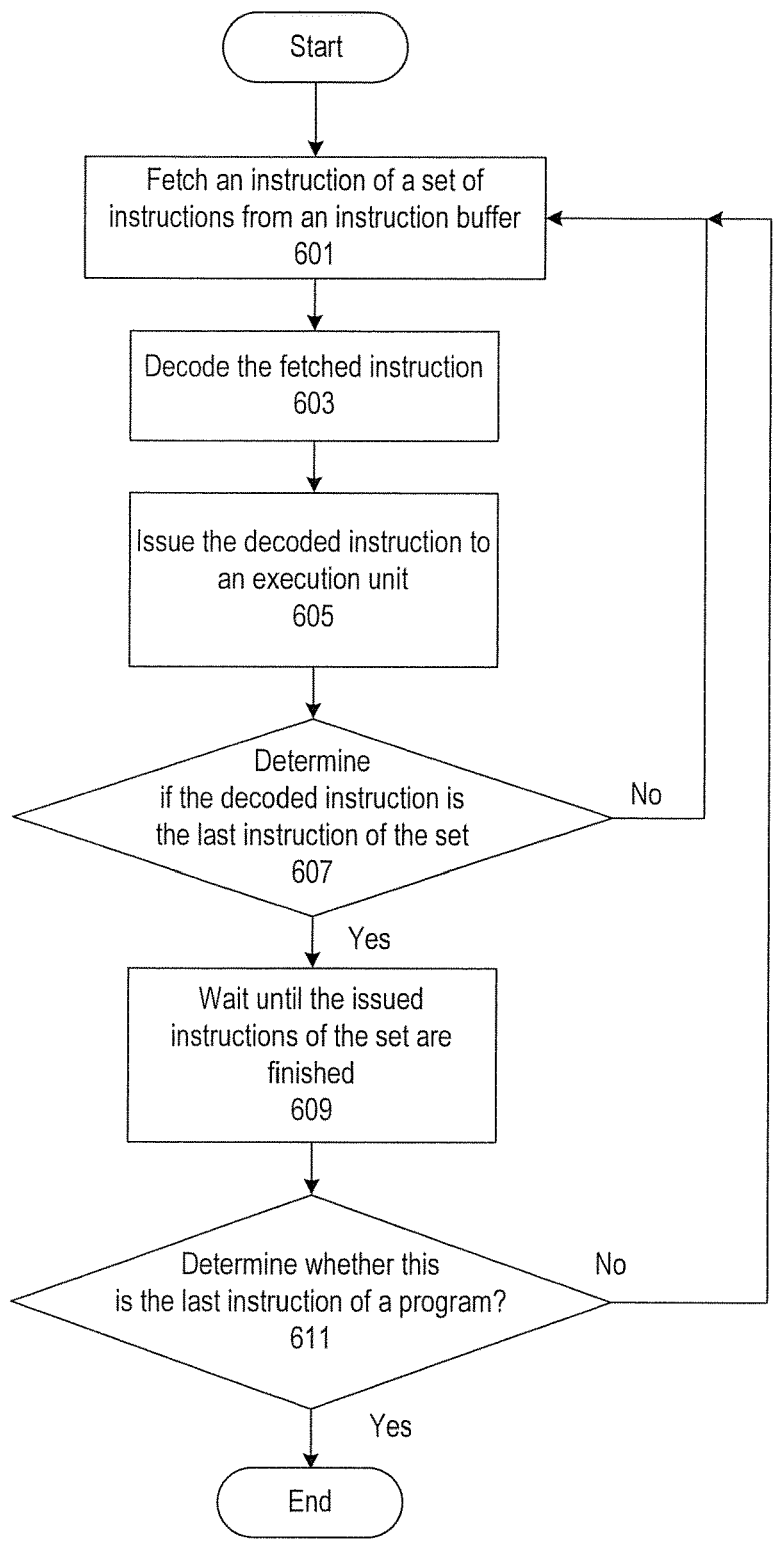
FIG. 6A illustrates a flowchart of a method for executing instructions, according to embodiments of the disclosure.

FIG. 6A illustrates a flowchart of a method 600 for executing instructions, according to embodiments of the disclosure. Method 600 can be executed by, for example, a core (e.g., core 2024) of an accelerator (e.g., NPU architecture 200). It is appreciated that the first few instructions received by the core can instruct the core to load/store data from a global memory (e.g., global memory 216) into an instruction buffer of the core.

In step 601, the core can fetch (via a fetch unit) an instruction of a continuous execution set (CES) from an instruction buffer. The instruction of the CES can also be referred to as the CES instruction. The instruction can be fetched on a per cycle basis. For example, the fetched CES instructions can include operations and operands. It is appreciated that, the CES instructions have been pulled from host memory 204 and pushed into the instruction buffer of each core before the core can fetch them. It is appreciated that, as the ILP has been explored by the compiler, the parallel instructions have been gathered to form the CES instructions for execution. And an indication bit is also set in the CES instruction to indicate a last instruction of the CES instructions.

Figure 6B:
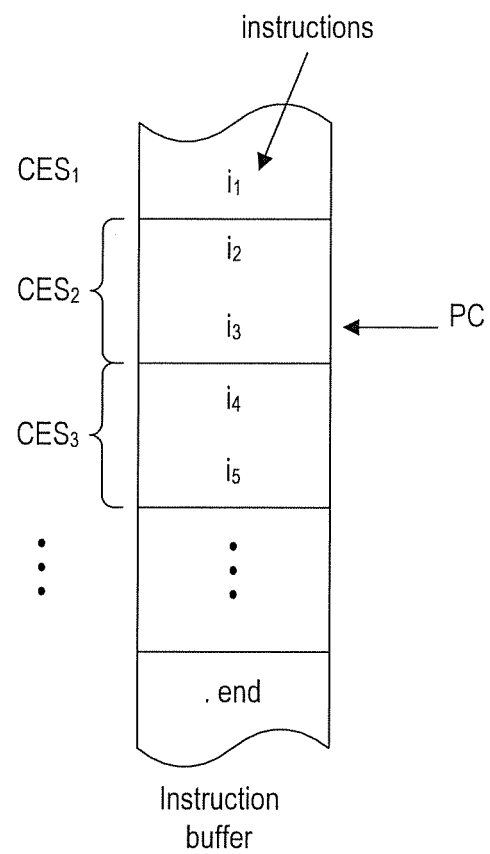
FIG. 6B illustrates an exemplary instruction buffer storing a set of instructions organized according to the CES architecture, according to embodiments of the disclosure.

For example, an exemplary instruction buffer is provided in FIG. 6B, in which instructions of a program are queued to be executed. In this example, instruction $i_1$ is part of CES instruction set $CES_1$, instructions $i_2$ and $i_3$ are part of CES instruction set $CES_2$ (and can be executed in parallel), instructions $i_4$ and $i_5$ are part of CES instruction set $CES_3$ (and can be executed in parallel), and so on. Considering that instructions $i_1$, $i_3$, and $i_5$ are each the last instruction of their corresponding CES instruction set, each of these instructions have a corresponding indication bit set to "1." In situations where a sole instruction is part of a CES instruction set (e.g., instruction $i_1$ of CES instruction set $CES_1$), this instruction would not be performed in parallel and the processing of operations would be similar to the Single-Issue execution 102 in FIG. 4.

In step 603, the core can decode (via an instruction decoder) the CES instruction. The instruction decoder can indicate which execution unit (e.g., ALU 226, LD/ST unit 228, or SF unit 230) will execute the CES instruction.

In step 605, the core can issue the decoded CES instruction to an execution unit for execution. For example, a MAD instruction can be issued to ALU 226, a LOAD instruction can be issued to LD/ST unit 228, and a cosine function can be issued to SF unit 230.

In step 607, the core can determine whether the issued instruction is a last instruction of the CES instructions has been issued. As discussed above, an indication bit is set to identify the last instruction of the instruction set. Accordingly, when the indication bit (last-instruction bit) is set to "1," the issued instruction is the last instruction of the set of CES instructions. Therefore, the core can identify the last instruction based on the indication bit of the CES instructions.

In response to the determination that the last instruction of the CES instructions has not been issued yet, the core can go back to step 601 and fetch a subsequent instruction. For example, referring to FIG. 6B as an example, if the program counter of the instruction buffer is pointing at instruction $i_2$ (which has a corresponding instruction bit of "0" that indicates that this instruction is not the last instruction of the set), the next instruction of the instruction set can be fetched (i.e., instruction $i_3$) so that instruction $i_2$ and $i_3$ can be executed in parallel.

Referring back to FIG. 6A, on the other hand, in response to the determination that the last instruction of the CES instructions has been issued, the core can go to step 609. For example, referring to FIG. 6B as an example, if the program counter of the instruction buffer is pointing at instruction $i_3$, because this instruction has a corresponding instruction bit of "1", this instruction is the last instruction of the set.

In step 609, the core can wait until the issued CES instructions have finished executing. It is appreciated that an execution of an instruction can take a plurality of cycles (e.g., 2048 clock cycles). And the clock-cycle expense of each instruction can be different. For example, among the CES instructions, a first instruction with a clock-cycle expense of 20 cycles may be issued for execution one cycle earlier than a second instruction with a clock-cycle expense of 25 cycles, and therefore the first instruction may finishes executing later than the second instruction. Thus, due to the different clock-cycle expenses of the CES instructions, the core may have to wait until the issued CES instructions have finished executing.

At step 611, the core can then determine whether the decoded instruction is the last instruction of the program. The core can make this determination by checking the instruction buffer (e.g., instruction buffer of FIG. 6B) on whether the instructions have reached the end. If not, the core can go back to step 601 and fetch a subsequent instruction. On the other hand, if the core has reached the end, the method can proceed to end.

After the execution of instructions, the execution results of the instructions can be loaded/stored in the local memory and then written back to the global memory or the host memory.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A system comprising:
a processing unit having a core configured to execute instructions; and
a host processing unit configured to:
compile computer code into a plurality of instructions that includes a set of instructions that are determined to be executed in parallel on the core, wherein the set of instructions each includes an operation instruction and an indication bit and wherein the indication bit is set to identify a last instruction of the set of instructions; and
provide the set of instructions to the processing unit for the core to execute;
wherein the core is configured to:
directly fetch an instruction from the set of instructions from an instruction buffer of the core in a first clock cycle,
determine whether the instruction is the last instruction of the set of instructions according to the indication bit, and
in response to a determination that the instruction is not the last instruction of the set of instructions,
fetch a subsequent instruction of the set of instructions in a second clock cycle subsequent to the first clock cycle,
determine the subsequent instruction is the last instruction of the set of instructions based on an indication bit associated with the subsequent instruction, and
in response to the determination that the subsequent instruction is the last instruction of the set of instructions, wait until the set of instructions finishes executing before executing another instruction.

2. The system of claim 1, wherein the set of instructions includes a number of parallel instructions that is less than or equal to a number of execution units capable of processing the parallel instructions, wherein the execution units are in the core.

3. The system of claim 1, wherein the indication bit has a width of one bit.

4. The system of claim 1, wherein the host processing unit is further configured to:
determine data dependency of the plurality of instructions;
determine the set of instructions that are to be executed in parallel based on the determined data dependency; and
set an indication bit for the last instruction of the set of instructions.

5. The system of claim 4, wherein the host processing unit is further configured to package the set of instructions into at least one instruction word.

6. The system of claim 1, wherein the processing unit comprises a plurality of cores for executing the set of instructions.

7. A method performed by a host processing unit, comprising:
compiling, by the host processing unit, computer code into a plurality of instructions that includes a set of instructions that are determined to be executed in parallel on a core of processing unit, wherein the set of instructions each includes an operation instruction and an indication bit and wherein the indication bit is set to identify a last instruction of the set of instructions; and
providing the set of instructions to the processing unit for the core to execute, wherein the set of instructions includes an instruction to be fetched by a core from an instruction from the set of instructions from an instruction buffer of the core in a first clock cycle to determine whether the fetched instruction is the last instruction of the set of instructions according to the indication bit associated with the fetched instruction, and wherein if the indication bit associated with the fetched instruction indicates that the fetched instruction is not the last instruction of the set of instructions, the set of instructions includes a subsequent instruction to be fetched by the core in a second clock cycle subsequent to the first clock cycle and to determine whether the fetched subsequent instruction is the last instruction of the set of instructions according to the indication bit associated with the fetched subsequent instruction, and wherein if the indication bit associated with the fetched subsequent instruction indicates that the fetched subsequent instruction is the last instruction of the set of instructions, the set of instructions finishes executing before another instruction to be executed by the core.

8. The method of claim 7, wherein the set of instructions includes a number of parallel instructions that is less than or equal to a number of execution units capable of processing the parallel instructions, wherein the execution units are in the core of the processing unit.

9. The method of claim 7, wherein the indication bit has a width of one bit.

10. The method of claim 7, further comprising:
determining data dependency of the plurality of instructions;
determining the set of instructions that are to be executed in parallel based on the determined data dependency; and
setting an indication bit for the last instruction of the set of instructions.

11. The method of claim 10, further comprising:
packaging the set of instructions into at least one instruction word.

12. A method performed by a core of a processing unit, the method comprising:
directly fetching an instruction of a set of instructions from an instruction buffer in a first clock cycle;
determining whether the instruction is a last instruction of the set of instructions based on an indication bit associated with the decoded instruction; and
in response to the determination that the instruction is not the last instruction of the set of instructions,
fetching a subsequent instruction of the set of instructions in a second clock cycle subsequent to the first clock cycle,
determining whether the subsequent instruction is the last instruction of the set of instructions based on an indication bit associated with the subsequent instruction, and
in response to the determination that the subsequent instruction is the last instruction of the set of instructions, waiting until the set of instructions finishes executing before executing another instruction.

13. The method of claim 12, wherein the execution unit comprises at least one of an arithmetic logic unit, a load/store unit, and a special function unit.

14. The method of claim 12, further comprising:
decoding the subsequent instruction; and
issuing the decoded subsequent instruction to an execution unit for execution.

15. The method of claim 14, further comprising executing the decoded subsequent instruction in parallel with the decoded instruction.

16. The method of claim 15, further comprising:
storing execution results corresponding to the set of instructions.

* * * * *